Nov. 13, 1928.
M. O. SCHUR
1,691,739
METHOD AND APPARATUS FOR TESTING THE SPREAD OF INK
Filed Dec. 16, 1921
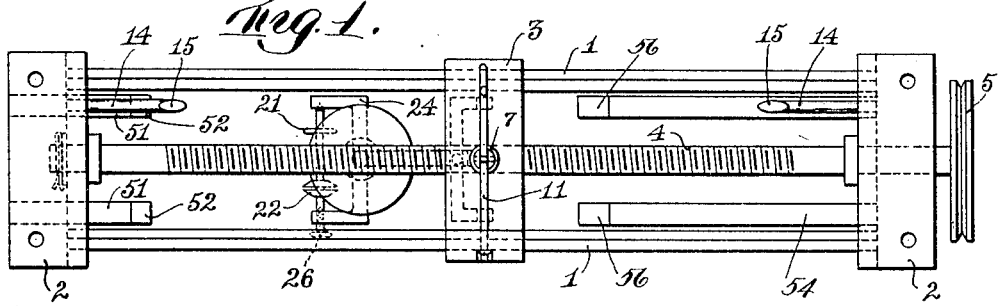
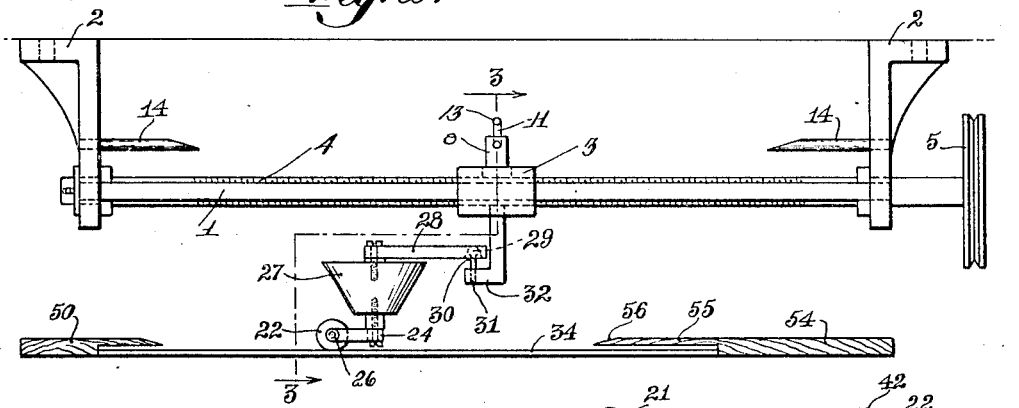
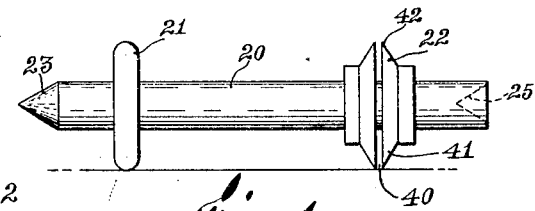
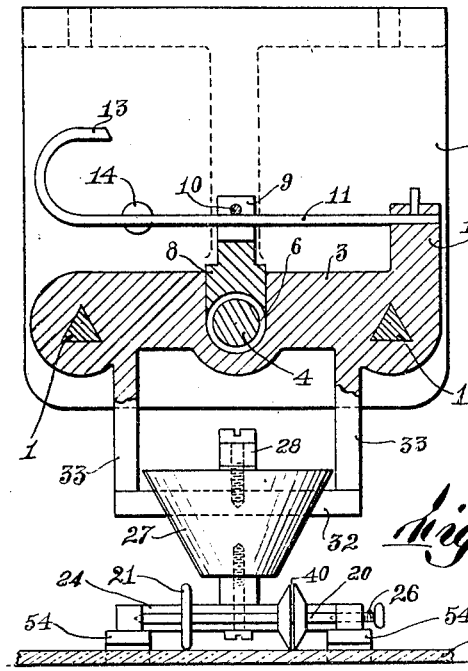
Inventor:
Milton O. Schur Patented Nov. 13, 1928.

1,691,739

UNITED STATES PATENT OFFICE.

MILTON O. SCHUR, OF BERLIN, NEW HAMPSHIRE, ASSIGNOR TO BROWN COMPANY, OF BERLIN, NEW HAMPSHIRE, A CORPORATION OF MAINE.

METHOD AND APPARATUS FOR TESTING THE SPREAD OF INK.

Application filed December 16, 1921. Serial No. 522,867.

One of the qualities essential to writing paper is that of ink fastness, or resistance to the spread of ink. However strong or well finished the paper may be, unless it retains ink with immaterial surface diffusion, it is worthless for writing purposes. While the inherent tendency of cellulose fibers to absorb water or ink may be opposed by the use of rosin size, the quantity of size used is no dependable index of the effectiveness of the sizing since many other factors such as the method of preparing the size and the condition of the beaten fibers play no small part in the final result.

Writing with a sharp steel pen and commercial ink furnishes some idea of ink fastness but no close indication for the purpose of comparison between different papers since observers are apt to vary widely in their judgment, particularly if the paper is indifferently sized. The nature of the pen stroke, whether bold or light, the angle of the pen relative to the paper, the speed of the stroke, the quantity of ink on the pen, and whether the observer be making, selling, or buying the paper are all material factors to be reckoned with. Such tests may, however, be of service to the beater engineer and machine tender to quickly and easily detect serious sizing defects during the manufacture of paper, but they are incapable of being reduced to numerical expression by which alone a true comparison between various papers is possible.

Other tests based on the idea of determining the time required for ink or a coloring matter or chemical to penetrate through a sheet of paper floated thereon or through the paper employed as a diaphragm in a conductivity cell have been proposed. These methods also are subject to the judgment of the observer, it being exceedingly difficult to determine just when penetration first takes place, or they measure factors related only indirectly to the effectiveness with which paper absorbs the coloring matter in ink, or they give no definite index of any difference in quality which may exist between the two sides of a sheet, whereas the value of the paper as to resistance to ink-spread is governed by the condition of the poorer side.

This invention, therefore, seeks to provide a method of measuring surface diffusion or spread and that only, under standard reproducible conditions and where the subjective element is eliminated. For this purpose a special form of pen has been devised to draw a line of definite width with a definite head of ink (preferably specially prepared) and under standard pressure, and mechanism for drawing the pen at a standard speed over the surface, it being intended that the entire apparatus be housed within a suitable enclosure in which conditions of humidity may be controlled. After the line is dry its width is measured by a low power microscope, the relation of the width when dry to the width when applied being reducible to numerical value and furnishing the required index for the quality of the paper. Incidentally with this method the thickness or weight of the paper need not be known to calculate the results.

For a more complete understanding of this invention reference may be had to the accompanying drawings in which Figure 1 is a plan of the operative portions of the apparatus.

Figure 2 is a side elevation thereof.

Figure 3 is a section on line 3—3 of Figure 2.

Figure 4 is an elevation of the pen and

Figure 5 is a similar view of a slightly modified form of pen.

Referring to Figures 1, 2, and 3 at 1 is shown a pair of guide rails supported at their ends in fixed brackets 2, these rails being shown as of triangular cross section. Slidable along these rails is a carriage 3 having apertures therethrough for the reception of the rails. Positioned between the rails is a screw 4 journaled at its opposite ends in the brackets 2 through one of which it extends and carried on its end is a pulley 5 for the reception of a driving belt by which the screw may be rotated. The carriage 3 has a perforation 6 therethrough for the slidable reception of the screw 4 and through its top face is a circular opening 7 extending to the perforation 6. Within the opening 7 is slidable a plug 8 having its lower face threaded to engage the threads of the screw 4. When this plug is in engagement with the screw, rotation of the screw causes the carriage 3 to traverse the rails 1 in one direction. The upper end of the plug 8 is slotted at 9 and passing transversely of this slot is a pin 10. Riding in this slot beneath the pin 10 is a spring arm 11 which is made fast at one end to an upstanding wall 12 at one side of the carriage and at its other end it is curved upwardly and over toward the wall 12 to form a hook 13. By grasping this hook the plug 8 may be removed from engagement with the screw 4 to disconnect the carriage from the screw. By this means the carriage may be moved along the rails in a direction opposite to that produced by the screw when by releasing this hook the screw may be disconnected from the carriage and thus made ineffective to traverse it. As shown in Figures 1 and 2 the direction of traverse by means of the screw is from left to right.

In order to prevent too great a traverse of the carriage which would bring it against the right hand bracket 2 and perhaps injure the mechanism, this bracket has projecting therefrom a bar or pin 14 having its outer end beveled at 15. This pin is positioned so that on traverse of the carriage the spring 11 engages on the beveled end 15 and rides up on the pin which removes the plug 8 from engagement with the screw so that the traverse of the carriage is stopped. The left hand bracket 2 has a similar pin 14 with a beveled end 15 for holding the plug 8 out of operative relation to the screw at the other end of its traverse before it is desired to operate the mechanism. The traverse of this carriage is designed to move the pen for making the test line as will be described.

The pen comprises a truck composed of a shaft 20 having spaced thereon a pair of wheels 21 and 22. One end of the shaft 20 is formed conical as at 23 to rest in a mating socket in a U-shaped frame 24. The other end of this shaft has a conical recess 25 in which engages the conical end of an adjusting screw 26 threaded through the opposite end of the frame 24. By this means the pen shaft 20 is readily replaced when necessary. The frame 24 carries at one side at its central portion a weight 27 to the upper end of which is made fast a draft arm or tongue 28 having at its forward end a socket 29 which takes over a ball 30 on a pin 31. This pin 31 is made fast to a bar 32 supported at opposite ends from a pair of uprights 33 depending from the carriage 3. The members 32 and 33 may be integral if desired. With this construction it is evident that traverse of the carriage 3 causes the axle 20 with its wheels to be drawn over a surface plate 34 preferably of glass to form a smooth hard backing for the paper, positioned beneath and parallel to the rails 1. One of the wheels on this axle, as at 22, is designed as the pen and for this purpose is provided with a circumferential ink-receiving groove 40. The lateral faces of the pen slope from the edge of this groove as shown at 41 in Figure 4, making a sharp angle therewith at 42. While this construction may allow the pen to be easily nicked, it is found in practice that such a pen is easier to fill with ink as there is no extended surface bearing on the paper to be smeared. If desired, however, the pen may be made as shown in Figure 5 in which the edges between the inclined faces 41' and the ink-receiving groove 40 are flattened as shown at 42', this construction being somewhat preferable in reducing the chances of injury to the pen by careless handling. The size of the pen wheel and the depth and width of the ink slot determine the effective pressure of the ink tending to flow onto the paper, the slot being filled at the start of each test.

It has been found desirable to occasionally rub a very thin layer of paraffin wax on the lateral faces of the pen-slope in order to reduce to a minimum any tendency of the ink to stick thereto.

In order that the pen may be held away from the paper before it is desired to traverse the carriage, a pair of blocks 50, each having a bar 51 with a beveled inner end 52 is positioned beneath the left hand bracket 2, these bars 51 engaging beneath the ends of the frame 24 and retaining the pen wheel 22 elevated above the surface of the paper positioned on the plate 34 and beneath these bars. Beneath the right hand bracket 2 a similar construction may be used comprising a pair of blocks 54 having extensions 55 with beveled outer ends 56 on which the truck frame 24 may ride as it approaches its right hand limit of motion.

In operation of this device the paper to be tested is placed on the plate 34 arranged parallel to and beneath the bars 51 and 55. The pen wheel 22 having been filled with ink is placed in position supported above the paper by means of the bars 51, the plug 8 being held out of engagement with the screw by means of the hook 13. The screw being revolved at a constant rate the plug 8 is allowed to descend thereon thus starting a traverse of the carriage 3 toward the right hand bracket. The truck frame 24 is then pulled away from the bars 51 and the wheels 21 and 22 are allowed to strike the paper, the truck being pulled toward the blocks 54 by means of the carriage 3. As the connection with this carriage is forward of the axle 20 and centrally between the wheels 21 and 22 any tendency to slew is counteracted so that no lateral motion of the pen as it is drawing the line is produced and the plane of the pen slot is maintained parallel to the line of draft. As the truck frame 24 reaches the projecting portions 55 it rides thereon, raising the pen from the paper.

The whole apparatus is preferably enclosed in a casing such as is commonly used for precision balances so that the degree of humidity may be closely controlled by any of the well known methods, it having been found that a marked increase of humidity causes an increased spread of the ink.

The ink line is allowed to dry and it is then removed from the machine and placed under a low powered microscope which preferably has its eyepiece provided with a micrometer in the shape of a set of rectangular co-ordinates on a portion of a thin photographic plate, it being found suitable to use a scale of these co-ordinates of about twenty divisions to an image of an object one millimeter long. The average width of the pen slot then being known it is a simple matter to measure the width of the dried line, this being preferably done at spaced intervals along the central portion of the line. These readings may then be averaged and from the mean the width of the pen slot may be deducted. This difference when divided by the pen slot width gives a numerical indication of the per cent ink spread. If desired the maximum readings within the areas viewed by the microscope may be used which gives a per cent maximum ink spread. Average results might be taken, however, if desired. The maximum spread is regarded as somewhat preferable in practice as this has more significance in the actual use of the paper, and because certain well sized papers do not take ink readily so that the line drawn with the pen is apt to be slightly broken or irregular. Hence a maximum width reading furnishes more regular and constant results.

Having thus described certain embodiments of this invention it should be evident that many changes and modifications might be made therein without departing from its spirit or scope as defined by the appended claims.

I claim:

1. A device of the class described comprising a shaft, a pair of wheels spaced apart on said shaft, one of said wheels having a circumferential ink-receiving slot therein, and means for exerting a drawing effort on said shaft, said means including a pivotal connection between said shaft and said means midway of said wheels through which said effort is exerted.

2. A device of the class described comprising a shaft, a pair of wheels spaced apart on said shaft, one of said wheels having a circumferential slot therein, and means for exerting a drawing effort on said shaft tending to maintain the plane of the pen slot parallel to the line of draft.

3. A device of the class described comprising a track, a carriage reciprocable along said track, a truck constructed to be drawn over a surface, a weight on said truck, a tongue on said truck having universal connection to said carriage whereby said truck may be drawn by said carriage, and a pen carried by said truck for drawing a line on the surface as the truck is moved.

4. A device of the class described comprising a track, a carriage reciprocable along said track, a truck constructed to be drawn over a surface, a weight on said truck, a tongue on said truck for universal connection to said carriage whereby said truck may be drawn by said carriage, a pen carried by said truck for drawing a line on the surface as the truck is moved, and means for raising the pen from the surface during part of its movement.

5. A device of the class described comprising a track, a carriage reciprocable on said track, and a truck adapted to be drawn along a surface by the movement of said carriage, said truck comprising a wheel having a circumferential ink-receiving slot therein bearing on the surface.

6. A device of the class described comprising a track, a carriage reciprocable on said track, and a truck adapted to be drawn along a surface by the movement of said carriage, said truck comprising a wheel having a circumferential ink-receiving slot therein bearing on the surface, and means holding said wheel away from the surface during a portion of the movement of said truck.

7. A device of the class described comprising a track, a carriage reciprocable on said track, means for moving said carriage toward one end of said track, means for disconnecting said moving means from said carriage as the carriage approaches said end, and a pen arranged to be drawn over a surface by said carriage.

8. A device of the class described comprising a pair of spaced guide rails, a carriage movable along said rails, a screw arranged parallel to said rails, a threaded element carried by said carriage normally in engagement with the threads of said screw, means to rotate said screw to cause said carriage to be moved toward one end of said rails, and a member fixed adjacent said end for disengaging said element from said screw as the carriage approaches said end.

9. A device of the class described comprising a plate, a pair of spaced guide rails parallel to and elevated above said plate, a carriage traversable along said rails, a truck arranged to move over said plate, draft connections between said truck and carriage, and a pen on said truck arranged to draw a line on a sheet supported on said plate as the carriage is moved.

10. A device of the class described comprising a plate, guides elevated above and substantially parallel to said plate, a carriage reciprocable along said guides, a shaft having a pair of wheels spaced thereon arranged to roll on a piece of sheet material on said plate, one of said wheels having an ink-receiving circumferential slot therein, a draft connection between said shaft and carriage, means to move said carriage toward one end of said guide, means acting to render said moving means inoperative when said carriage approaches said end, and means holding said wheels out of contact with the sheet at each end of their traverse.

11. A method of testing the ink fastness of paper, which comprises drawing an ink line thereon of known width when wet under substantially constant reproducible line-width-affecting conditions, and comparing with said known width the width of said line when the ink is dry.

12. A method of testing the ink fastness of paper, which comprises drawing an ink line thereon with a pen under substantially constant reproducible conditions of humidity, head of ink in pen, width of pen slot, pressure of pen against paper, angle of contact between pen and paper, and linear speed of drawing; and comparing the width of the dried line with the width of the line as applied.

13. A method of obtaining an expression for the ink fastness of paper, which comprises drawing an ink line thereon with a pen under substantially constant reproducible conditions of humidity, head of ink in pen, width of pen slot, pressure of pen against paper, angle of contact between pen and paper, and linear speed of drawing; ascertaining the width of the pen slot; magnifying and determining the width of the dried line; and expressing the increase in the width of the dried line over that of the pen slot in terms of one of said widths.

In testimony whereof I have affixed my signature.

MILTON O. SCHUR.